United States Patent [19]

Spellman et al.

[11] Patent Number: 5,295,404

[45] Date of Patent: Mar. 22, 1994

[54] SHIFT LEVER MECHANISM FOR ENGINE STARTING APPARATUS

[75] Inventors: James A. Spellman, Noblesville; Ross A. Gresley; Lee A. Finley, both of Anderson, all of Ind.

[73] Assignee: General Motors Corporation, Detroit, Mich.

[21] Appl. No.: 985,706

[22] Filed: Dec. 4, 1992

[51] Int. Cl.⁵ .................. G05G 3/00; G05G 1/04; F02N 15/06
[52] U.S. Cl. ........................ 74/7 A; 74/519; 403/11; 403/79
[58] Field of Search ............. 74/6, 7 A, 519; 403/11, 403/13, 14, 79, 113, 117; 192/99 S; 290/38 R, 38 C, 48

[56] References Cited

U.S. PATENT DOCUMENTS

| 4,495,825 | 1/1985 | Ruhle | 74/7 A X |
| 4,579,010 | 4/1986 | Colvin et al. | 74/7 |
| 5,142,923 | 9/1992 | McKnight et al. | 74/7 A X |

*Primary Examiner*—Allan D. Herrmann
*Attorney, Agent, or Firm*—Creighton R. Meland

[57] ABSTRACT

A shift lever mechanism for an engine starter for translating axial movement of the plunger of a starter solenoid into axial movement of a starter drive pinion. The shift lever mechanism has a retainer that has two axially extending spaced arms. Each arm has an opening that is defined by a circular portion and a radially extending slot. A shut lever is pivotally supported by the retainer. The shift lever has opposed bosses that are respectively located in the openings in the arms. The bosses have radially extending ribs that are located in the slots. The slots and ribs allow the shift lever to be assembled to the retainer in only one proper orientation of the shift lever relative to the retainer.

4 Claims, 2 Drawing Sheets

SHIFT LEVER MECHANISM FOR ENGINE STARTING APPARATUS

BACKGROUND

This invention relates to a shift lever mechanism for translating axial movement of the plunger of a starter or cranking motor solenoid into shiftable movement of a pinion that is adapted to be meshed with the ring gear of an engine to be cranked.

The United States patent to Colvin et al., U.S. Pat. No. 4,579,010, discloses a shift lever mechanism that has a support or retainer that is adapted to be secured to housing parts of an engine starter. The retainer has a pair of axially extending spaced arms each of which has a circular hole. The retainer pivotally supports a shift lever which has two circular bosses that are respectively located in the circular holes formed in the arms of the retainer.

A problem associated with the shift lever mechanism of the type disclosed in the above-referenced Colvin et al. patent is that it is possible to assemble the shift lever to the retainer such that the shift lever ends up in an orientation or position that is reversed or backwards from the position that it should be in. To further explain this, let it be assumed that for proper orientation of the shift lever relative to the retainer, that a first boss on the shift lever should fit into a first hole in one arm of the retainer and that a second boss on the shift lever should fit into a second hole in the other arm of the retainer. Since the bosses on the shift lever are the same size and the holes in the arms of the retainer are the same size, it can be appreciated that the shift lever can be assembled such that the first boss is inserted into the second hole and the second boss is inserted into the first hole with the result that the shift lever would be assembled backwards or reversed from the position it should be in. Such a backward or reversed assembly of the shift lever to the retainer results in producing a shift lever assembly that cannot be use.

SUMMARY OF THE INVENTION

It accordingly is an object of this invention to provide a shift lever mechanism of the type that has been described that is arranged such that the shift lever can be assembled to the retainer in only one proper orientation or position. In carrying this object forward, the spaced arms of the retainer are each provided with a hole or opening. The shape of these holes or openings is primarily circular but has a radially extending slot that joins or merges into the circular portion. The shift lever has two bosses which fit into the openings in the arms of the retainer. These bosses have a shape which is primarily circular but which has a radially extending projection or rib that fits into a radially extending slot of an opening formed in an arm of the retainer. With this arrangement, the lever can only be assembled to the retainer by inserting the projections on the bosses into slots in the arms of the retainer and accordingly the lever can only be assembled to the retainer in one proper position or orientation relative to the retainer.

IN THE DRAWINGS

DETAILED DESCRIPTION OF A PREFERRED EMBODIMENT

Figure 1:
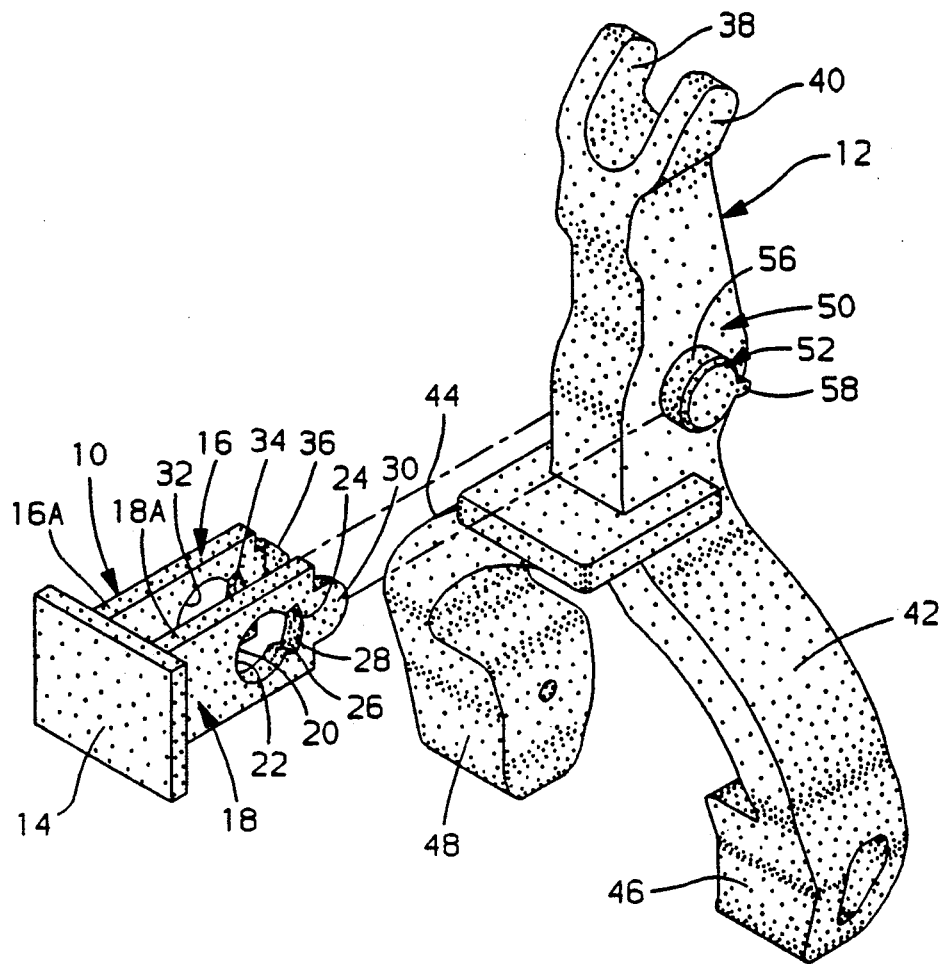
FIG. 1 is an exploded perspective view of a shift lever mechanism made in accordance with this invention.
Figure 2:
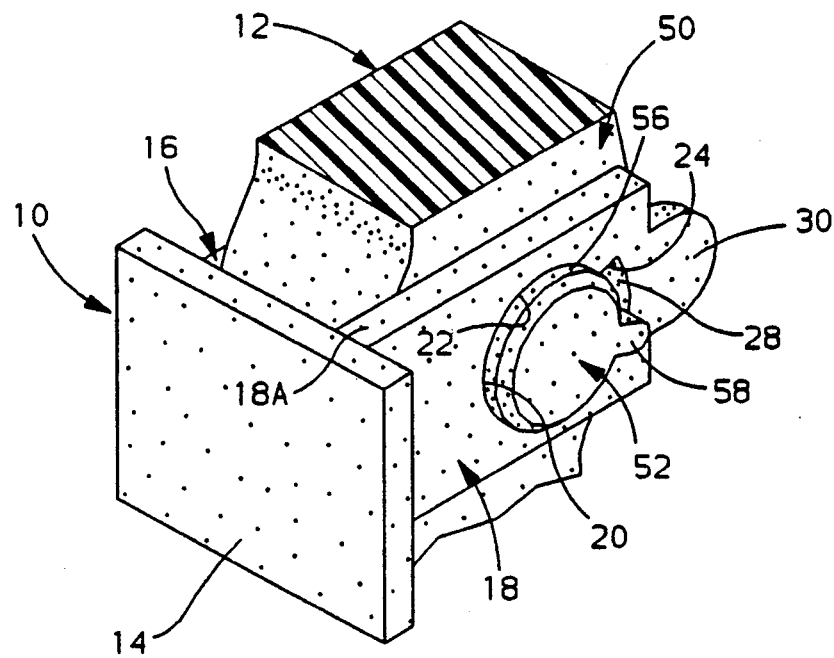
FIG. 2 is a perspective view illustrating the shift lever assembled to the retainer.

Referring now to the drawings, the shift lever mechanism of this invention comprises a shift lever support or retainer generally designated as 10 and a shift lever generally designated as 12.

The retainer 10 is formed of a plastic material and is a one-piece molded plastic part. The retainer 10 has an end portion 14 and a pair of spaced axially extending arms 16 and 18 that extend from portion 14. The arm 18 has an opening or hole 20 that is defined in part by a circular surface 22. The opening 20 is further defined by a radially extending slot that is comprised of opposed surfaces 24 and 26 and an arcuate or curved surface 28. The surfaces 24 and 26 may be about thirty-two angular degrees apart and, accordingly, the circular surface 22 extends for about 228 angular degrees. The arm 18 has an end portion 30 that has a curved end surface that is adapted to fit into a groove formed in a housing of an engine starter.

The arm 16 is identical to arm 18 and is exactly aligned with arm 18, that is, the outer outline surfaces of arm 16 are exactly aligned with the outer outline surfaces of arm 18. The arm 16 has a hole or opening 32 which is identical to hole 20 in arm 18. Thus, hole or opening 32 is defined by a circular surface that is identical to circular surface 22. Further, opening 32 is defined by surfaces that provide a radially extending slot 34. The surfaces that define slot 34 are identical to surfaces 24, 26 and 28 and are exactly aligned with surfaces 24, 26 and 28. The arm 16 has a portion 36 that performs the same function as portion 30 of arm 16.

The shift lever 12 is formed of a plastic material and is a one-piece molded plastic part. The upper end of lever 12 is forked and is comprised of arms 38 and 40. The lever 12 has a lower forked end comprised of arms 42 and 44. The arm 42 has a starter drive actuating portion 46 and arm 44 has a starter drive actuating portion 48. The lever 12 further has a central portion 50 located between the forked end portions.

The central portion 50 of lever 12 has two bosses or posts 52 and 54. The boss 52 has a circular surface 56 and a radially extending projection or rib 58 that extends the entire length of boss 52.

The boss or post 54 is identical with boss 52. It has the same length and diameter as boss 52 and has a radially extending rib 59 which is identical to rib 58. Boss 54 has a circular surface 61 that is identical to the circular surface 56 of boss 52. Further, the circular surfaces of the bosses 52 and 54 are exactly aligned and the rib 58 on boss 52 is exactly aligned with the rib 59 on boss 54.

To assemble the lever 12 to the retainer 10, the arms 16 and 18 are forced or deflected apart and the central portion 50 and bosses 52 and 54 of lever 12 are moved into the space between the arms. When the respective circular portions of the bosses become aligned respectively with the circular portions of the holes or openings in the arms and the respective ribs on the bosses become aligned with the radial slots in the arms, the arms move back toward each other thereby causing the circular portions of the bosses to be located in the circular portions of the openings in the arms with the ribs on the bosses being located in the radial slots in the arms of the retainer.

It can be seen that in the final assembled condition of the retainer 10 and lever 12, the lever 12 is pivotally supported by retainer 10. Thus, the lever 12 can pivot about the longitudinal axis of bosses 52 and 54.

The amount of pivotal movement of lever 12 relative to retainer 10 is limited by the angular spacing between slot surfaces 24 and 26. However, in the use of the shift lever mechanism in an engine starter, the amount of pivotal movement of lever 12 that is needed is not large enough to cause rib 58 to engage either wall 24 or wall 26.

It can be appreciated that if an attempt were made to assemble lever 12 to retainer, where lever 12 was positioned backwards from its position shown in FIG. 1, that is, where lever 12 is positioned such that the ribs, like rib 58 point to the left in FIG. 1 instead of to the right as shown, it would be impossible to assemble the lever 12 to retainer 10. Thus, in a backwards position of lever 12, the ribs on the bosses would engage inside surfaces of the arms that are located adjacent the cylindrical portion of the openings in the arms 16 and 18 to prevent the bosses from entering the openings in the arms.

In regard to the position of the retainer 10 relative to lever 12 when these parts are assembled, the retainer 12 can be in the position shown in FIG. 1 where surfaces 16A and 18A face up as shown in FIG. 1 or could be in a position where surfaces 16A and 18A would face down in FIG. 1. The reason for this is that the parts that make up retainer 12 are symmetrical. Thus, arms 16 and 18 are identical and are exactly aligned. Further, the openings in the arms are identical as to size and shape and are exactly aligned.

Figure 3:
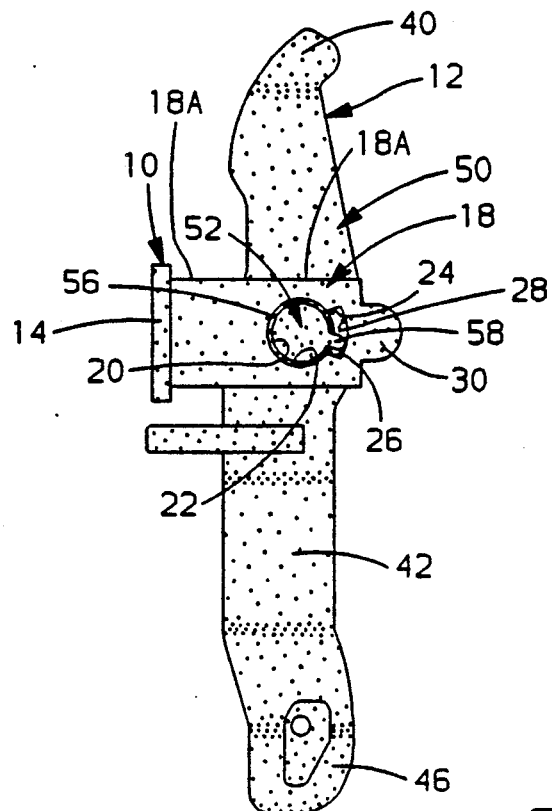
FIG. 3 is a side view of the shift lever assembled to the retainer.
Figure 4:
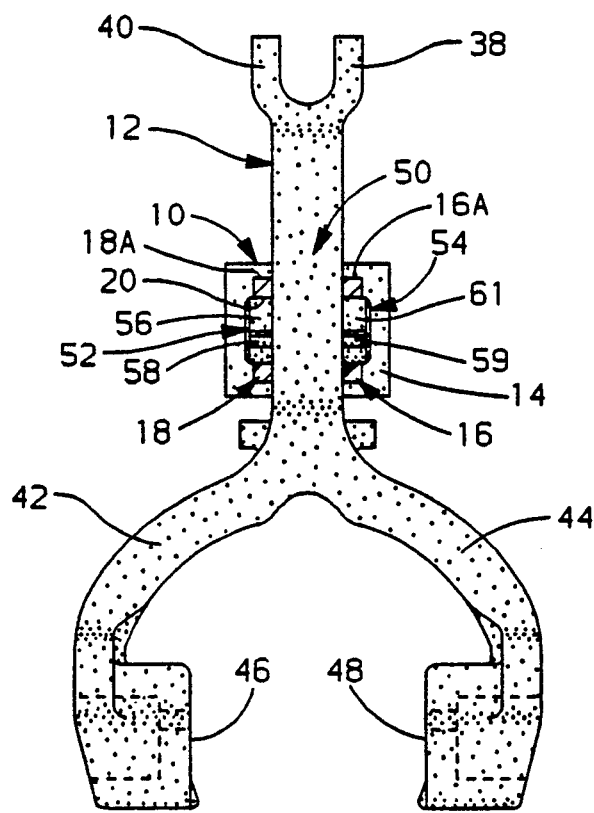
FIG. 4 is an end view, partly in section, of the shift lever assembled to the retainer.

The shift lever mechanism that has been described, if assembled into an electric starter of the type disclosed in the above-referenced Colvin et al. patent. The retainer is fixed to starter housing parts in a manner disclosed in that patent. The upper end of the shift lever, 12 that includes arms 38 and 40, cooperates with a part that is moved by the armature or plunger of the starter solenoid. The portions 46 and 48 of shift lever 12 cooperate with starter drive parts that include a pinion. Pivotal movement of shift lever 12 causes the pinion to be shifted into or out of engagement with an engine ring gear. In use, the lever 12 pivots counter-clockwise in FIG. 3 to cause the pinion to mesh with the ring gear. Lever 12 pivots clockwise to cause the pinion to be moved out of engagement with the ring gear.

The embodiments of the invention in which an exclusive property or privilege is claimed are defined as follows:

1. A shift lever mechanism comprising, a retainer having first and second axially extending spaced arms, a first opening in said first arm, said first opening being defined by a first circular surface and surfaces that form a first radially extending slot, a second opening in said second arm, said second opening being defined by a second circular surface and surfaces that form a second radially extending slot, a shift lever pivotally supported by said retainer, said shift lever having a first and second outwardly extending opposed bosses, said first boss located in said first opening, said first boss having a cylindrical surface and a radially extending rib that is located in said first slot, said second boss located in said second opening, said second boss having a cylindrical surface and a radially extending rib that is located in said second slot, said slots and ribs operative to allow said shift lever to be assembled to said retainer in only one proper orientation of said shift lever relative to the retainer.

2. The shift lever mechanism according to claim 1 where said retainer is formed of plastic material and where said arms can be deflected apart to permit said shift lever to be assembled to said retainer.

3. The shift lever mechanism according to claim 1 where both said shift lever and said retainer are formed of plastic material.

4. The shift lever mechanism according to claim 1 where the circular surfaces in said arms are aligned and where the slots in said arms are aligned.

* * * * *